UNITED STATES PATENT OFFICE 2,455,895

PREPARATION OF ALKALI METAL SALTS OF DICYANIMIDE

Daniel E. Nagy and Bryan C. Redmon, Stamford, Conn., assignors to American Cyanamid Company, New York, N. Y., a corporation of Maine No Drawing. Application September 22, 1945, Serial No. 618,071

7 Claims. (Cl. 23—75)

The present invention relates to a method for preparing alkali metal salts of dicyanimide and to these salts which are new compounds.

In particular the present invention contemplates the reaction of a dicyanimide salt of a metal chosen from the group consisting of calcium, copper, and zinc, with an alkali metal salt, the anion portion of which forms a substantially insoluble inorganic salt of calcium, copper, or zinc. The general reaction is given by Equation 1.

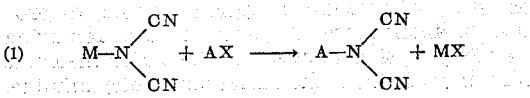

where A is an alkali metal, M is a metal chosen from the group consisting of calcium, copper, and zinc, and AX is an alkali metal salt whose anion portion, X, forms a substantially insoluble salt with M.

Typical examples of the alkali metal salts suitable for carrying out the present invention are:

| | |
|---|---|
| Sodium hydroxide | Trisodium phosphate |
| Lithium hydroxide | Tripotassium phosphate |
| Potassium hydroxide | Disodium phosphate |
| Sodium carbonate | Dipotassium phosphate |
| Potassium carbonate | Sodium tartrate |
| Sodium bicarbonate | Potassium tartrate |
| Lithium bicarbonate | Sodium tungstate |
| Potassium bicarbonate | Potassium tungstate |
| Sodium sulfate | Sodium sulfide |
| Lithium sulfate | Lithium sulfide |
| Potassium sulfate | Potassium sulfide |
| Sodium sulfite | Sodium selenide |
| Lithium sulfite | Potassium selenide |
| Potassium sulfite | Sodium telluride |
| Sodium fluoride | Sodium arsenate |
| Potassium fluoride | Potassium arsenate |
| Sodium oxalate | Sodium ferrocyanide |
| Lithium oxalate | Potassium ferrocyanide |
| Potassium oxalate | |

Similar soluble salts of cesium and rubidium may also be used. The anion portion of the aforementioned salts gives a precipitate with one or more of the three cations, calcium, copper, and zinc.

Typical substantially insoluble salts of calcium are:

| | |
|---|---|
| Calcium hydroxide | Tricalcium phosphate |
| Calcium carbonate | Dicalcium phosphate |
| Calcium sulfate | Calcium tartrate |
| Calcium sulfite | Calcium tungstate |
| Calcium fluoride | Calcium arsenate |
| Calcium oxalate | |

Typical substantially insoluble copper salts are:

| | |
|---|---|
| Cupric hydroxide | Cupric tartrate |
| Cupric carbonate | Cupric sulfide |
| Cupric oxalate | Cupric arsenate |
| Cupric phosphate | Cupric ferrocyanide |

Typical substantially insoluble zinc salts are:

| | |
|---|---|
| Zinc hydroxide | Zinc selenide |
| Zinc carbonate | Zinc telluride |
| Zinc oxalate | Zinc arsenate |
| Zinc phosphate | Zinc ferrocyanide |
| Zinc sulfide | |

In particular, the present invention contemplates that an alkali metal dicyanimide may be prepared by the reaction in water of a metal dicyanimide and an alkali metal salt, the anion portion of which will combine with and precipitate the cation or metal attached to the aforementioned metal dicyanimide, so that it may easily be separated from the resulting alkali metal dicyanimide.

Example 1

The aqueous suspension of zinc dicyanimide is prepared and 20% aqueous potassium hydroxide is added thereto until the pH of this agitated mixture remains at 8–9. The substantially insoluble zinc hydroxide is removed by filtration and the filtrate is neutralized with a few drops of 10% hydrochloric acid. This neutral filtrate is then concentrated under reduced pressure until crystals of potassium dicyanimide start to form, at which time the residue is diluted with acetone or isopropanol. This treatment causes additional crystalline potassium dicyanimide to form, and after recovery, purification, and drying, the colorless crystalline potassium dicyanimide melts at 228° C.

Example 2

By following the general procedure outlined in the above, potassium dicyanimide is also prepared by the interaction of substantially stoichiometric amounts of potassium carbonate and zinc dicyanimide. The crystalline solid obtained by this method melts at the same point as that recorded above.

Example 3

Potassium dicyanimide is also prepared by the interaction of aqueous potassium hydroxide with copper dicyanimide. The colorless crystalline potassium dicyanimide obtained by the method is identical with that obtained by the methods indicated above.

Example 4

An aqueous slurry of zinc dicyanimide is made alkaline with aqueous sodium hydroxide until the pH of the agitated reaction mixture remains at 8–9. The zinc hydroxide is filtered and the filtrate obtained therefrom is evaporated to dryness to yield colorless crystalline sodium dicyanimide which does not melt up to 315° C.

In order to characterize this solid, the optical and crystallographic properties are described. Sodium dicyanimide crystallizes as lamellar plates and has a positive optic sign. The principal refractive indices as observed in white light are as follows: $\alpha = 1.410 \pm 0.003$; and $\beta = 1.484 \pm 0.003$. The apparent optic axial angle as observed in air is 86°, and the true optic axial angle computed therefrom is 55°.

Example 5

Substantially stoichiometric amounts of zinc dicyanimide and aqueous sodium carbonate react to form substantially insoluble zinc carbonate which is removed by filtration. The resulting filtrate is evaporated to dryness and yields sodium dicyanimide having the above mentioned physical properties. Substitution of sodium bicarbonate for sodium carbonate gives equally satisfactory results in the preparation of sodium dicyanimide from zinc dicyanimide.

Example 6

Sodium dicyanimide is also prepared by the action of aqueous trisodium phosphate on zinc dicyanimide. A 20% trisodium phosphate solution is added to an aqueous slurry of zinc dicyanimide until the pH remains at 8–9. The substantially insoluble zinc phosphate is removed and the sodium dicyanimide is recovered by concentration of this filtrate and its physical properties are those already mentioned.

Example 7

Substantially stoichiometric amounts of an aqueous solution of calcium dicyanimide and 25% sodium hydroxide are mixed and thoroughly agitated. The calcium hydroxide thus precipitated is filtered and washed free of any sodium dicyanimide. The combined filtrate and washings are evaporated to dryness to yield sodium dicyanimide having physical properties identical with those mentioned in Example 4.

Example 8

The substitution of sodium carbonate and/or sodium sulfate for the sodium hydroxide above mentioned will precipitate either calcium carbonate or calcium sulfate which can be removed from the presence of the aqueous sodium dicyanimide. The latter may be recovered by concentrating the aqueous solution until crystalline sodium dicyanimide separates.

Example 9

A solution of calcium dicyanimide which is obtained by the reaction of calcium cyanamide with cyanogen chloride also yields sodium dicyanimide when treated with sodium carbonate, sodium hydroxide, or sodium sulfate. In addition to calcium dicyanimide this reaction mixture contains calcium chloride. The calcium is completely precipitated by the addition of sufficient 15–20% sodium carbonate solution to combine with the calcium ion united with both dicyanimide and chloride ions. The substantially insoluble calcium carbonate is removed by filtration, and the aqueous filtrate containing both sodium chloride and sodium dicyanimide is concentrated. When the water removal progresses to such a point that the concentration of the sodium chloride is 25%–35%, the sodium dicyanimide readily crystallizes and is recovered. It has physical properties identical with those reported above.

The aforementioned examples illustrate the several ways in which alkali metal dicyanimide may be prepared and recovered.

The alkali metal dicyanimides of the present invention are valuable chemical intermediates and sources of dicyanimide which may be used in the preparation of pharmaceuticals, chemotherapeutic agents, insecticides, dyes, plastics, resins, and the like.

While the invention has been described with particular reference to specific embodiments, it is to be understood that it is not to be limited thereto, but is to be construed broadly and restricted solely by the scope of the appended claims.

What is claimed:

1. A method of preparing an alkali metal salt of dicyanimide which includes the steps of reacting in water a dicyanimide salt of a metal chosen from the group consisting of calcium, copper, and zinc with an alkali metal salt, the anion portion of which forms a substantially water insoluble inorganic salt of a metal chosen from the group consisting of calcium, copper, and zinc, to produce an alkali metal dicyanimide, and removing the aforementioned substantially water insoluble inorganic salt from the alkali metal dicyanimide.

2. A method of preparing an alkali metal salt of dicyanimide which includes the steps of reacting in water a dicyanimide salt of a metal chosen from the group consisting of calcium, copper, and zinc with an alkali metal salt, the anion portion of which forms a substantially water insoluble inorganic salt of a metal chosen from the group consisting of calcium, copper, and zinc, to produce an alkali metal dicyanimide, removing the aforementioned substantially water insoluble inorganic salt from the alkali metal dicyanimide, and recovering the alkali metal dicyanimide.

3. The method of claim 2 in which the alkali metal is sodium.

4. The method of claim 2 in which the alkali metal is potassium.

5. A method of preparing sodium dicyanimide which includes the steps of reacting in water a dicyanimide salt of a metal chosen from the group consisting of calcium, copper, and zinc with a sodium carbonate to form a substantially water insoluble carbonate and soluble sodium dicyanimide, removing the thus formed substantially water insoluble carbonate from the aqueous solution containing sodium dicyanimide, concentrating the resultant solution to form solid sodium dicyanimide, and recovering the sodium dicyanimide.

6. A method of preparing sodium dicyanimide which includes the steps of reacting in water a dicyanimide salt of a metal chosen from the group consisting of calcium, copper, and zinc with a solution containing sodium hydroxide to form a substantially water insoluble hydroxide and soluble sodium dicyanimide, removing the thus formed substantially water insoluble hydroxide from the aqueous solution containing sodium dicyanimide, concentrating the resultant solution to form solid sodium dicyanimide, and recovering the sodium dicyanimide.

7. A method of preparing potassium dicyanimide which includes the steps of reacting in water a dicyanimide salt of a metal chosen from the group consisting of calcium, copper, and zinc with a solution containing potassium hydroxide to form a substantially water insoluble hydroxide and soluble potassium dicyanimide, removing the thus formed substantially water insoluble hydroxide from the aqueous solution containing potassium dicyanimide, concentrating the resultant solution to form solid potassium dicyanimide, and recovering the potassium dicyanimide.

DANIEL E. NAGY.
BRYAN C. REDMON.

REFERENCES CITED

The following references are of record in the file of this patent:

"Comptes Rendus," article by Manguin and Simon, vol. 170, pp. 999–1001 (1920).

"Chemical Abstracts," article by Franklin, vol. 16, p. 1194 (1922); also Journal of American Chemical Society, vol. 44 (1922), pp. 486–509.